Patented Feb. 22, 1949

2,462,251

UNITED STATES PATENT OFFICE 2,462,251

PROCESS FOR PREPARING ASCORBIC ACIDS

Henry H. Bassford, Jr., and William S. Harmon, Elizabeth, and John F. Mahoney, Westfield, N. J., assignors to Merck & Co., Inc., Rahway, N. J., a corporation of New Jersey No Drawing. Application May 16, 1945, Serial No. 594,171

21 Claims. (Cl. 260—344.5)

This invention relates generally to processes for preparing l-ascorbic acid and related compounds, and particularly to an improved process for obtaining such compounds from 2-keto-l-gulonic acid, its analogues, and derivatives thereof.

It is known that rearrangement of compounds such as 2-keto-l-gulonic acid is effected by the action of hydrochloric acid, either concentrated or dilute, to form l-ascorbic acid in hydrochloric acid solution. l-Ascorbic acid is recovered from such solution by crystallization followed by vacuum concentration of the mother liquors, and then purified.

Rearrangement by this method, particularly when concentrated hydrochloric acid is used, is objectionable because of the excessive foaming of the reaction mixture accompanied by darkening and destruction of the ascorbic acid produced.

Crystallization and isolation of the l-ascorbic acid is complicated by its high solubility in concentrated hydrochloric acid and by the presence of dark tarry decomposition products which interfere with filtration. Concentration of the mother liquors is also difficult to carry out technically and usually results in destruction of about half of the vitamin content. Contrary to indications in the prior art that l-ascorbic acid is stable in concentrated hydrochloric acid, it has been found that it decomposes according to a first order reaction, and that the half-life of l-ascorbic acid in concentrated hydrochloric acid is relatively short, viz., approximately five hours at 70° C. The high percentage of l-ascorbic acid retained in the mother liquors, coupled with the inherent loss during concentration of the mother liquors, limits the commercial yield of l-ascorbic acid from 2-keto-l-gulonic acid by these methods to about 65% of theory.

When dilute aqueous hydrochloric acid is used in rearrangement, the l-ascorbic acid can be isolated by concentrating and then crystallizing as above described. In this event, however, the disadvantages above referred to are still present. It has also been proposed to neutralize at least part of the hydrochloric acid prior to concentration. This would tend to reduce the loss due to decomposition of l-ascorbic acid by concentrated hydrochloric acid, but at the same time new losses are introduced in separating the inorganic salt formed in neutralization.

According to another known process 2-keto-gulonic acid derivatives are rearranged by heating to reflux in chloroform-alcohol solution containing anhydrous hydrogen chloride gas. This process, however, requires use of very large amounts of solvent due to low solubility of 2-keto-gulonic acid or its derivatives therein. The process is also characterized by a long reaction time (about 50 hours) and inconvenience in using anhydrous hydrogen chloride gas. These factors are serious disadvantages to commercial use of the process.

It is now discovered, according to the present invention, that the above-mentioned disadvantages of known processes can be overcome, and compounds such as 2-keto-l-gulonic acid, its analogues, and derivatives thereof can be molecularly rearranged to l-ascorbic acid and the like and the product isolated in a single operation which gives an excellent yield of substantially pure product.

Regarded in certain of its broader aspects, the process, according to the present invention, comprises adding to a solution of a compound of the class consisting of 2-keto-l-gulonic acid, its analogues, and derivatives thereof, in concentrated aqueous hydrohalic acid, an organic solvent which is immiscible with said solution and which is a non-solvent for l-ascorbic acid and analogues thereof, heating the mixture thus obtained to effect rearrangement of said compound, and to effect azeotropic distillation of hydrohalic acid, and volatile products of the rearrangement together with said organic solvent, continuing said heating while feeding additional organic solvent to the mixture until substantially all of the hydrohalic acid is removed, thereby forming a slurry of crystalline product of the class consisting of l-ascorbic acid and analogues thereof in organic solvent, and recovering the crystalline product from said slurry.

The process of the present invention can be carried out either as a two-stage process wherein rearrangement and isolation of product are effected separately while subjecting the reaction mixture to different conditions, or by properly selecting the reaction condition, as single-stage process, whereby rearrangement and isolation are effected simultaneously. The latter adaptation, as will be apparent, is particularly suited to continuous operation.

In carrying out the process of the present invention a compound such as 2-keto-l-gulonic acid, an analogue of 2-keto-l-gulonic acid, or a derivative thereof, is heated in a mixture of concentrated hydrochloric acid and a small amount of organic solvent which is immiscible with the hydrochloric acid and is a non-solvent for the product to be formed in the rearrangement. This solvent is preferably a non-polar solvent although it may be a mixture of polar and non-polar solvents, predominantly the latter. Polar organic solvents are at least partly miscible with the concentrated hydrochloric acid and the presence of any large quantity of such solvent during rearrangement decreases the efficiency of rearrangement.

The solvent is also preferably of sufficiently low density that it forms a separate layer above the acid solution of the sugar derivative. This layer protects the reaction mixture from air oxidation which normally cuts down the efficiency of rearrangement. In the case of rearrangement of derivatives which yield volatile ketones and alcohols, for example, diacetone keto gulonic acid, methyl keto gulonate, and the like, the ketone or alcohol which is liberated dissolves in the solvent layer, thereby facilitating its removal from the rearrangement mixture. In the case of acetone, particularly, this eliminates objectionable foaming and retards formation of acetone polymer tars.

Further, in accordance with the present invention, it is found that by subjecting the rearrangement mixture to proper conditions of temperature and pressure while adding more solvent thereto, it is possible to distill azeotropically hydrochloric acid and solvent from the rearrangement mixture with practically no decomposition of the l-ascorbic acid or other rearrangement product. For example, when a rearranged solution is distilled azeotropically at about 50° C. and 29 inch vacuum, 95–98% of the product of the rearrangement is recovered as a single crop of crystalline material. The distillation, however, can be carried out by heating the solvent-hydrochloric acid mixture at its boiling point at atmospheric pressure as well as under vacuum or, if desired, the mixture may be heated to slightly below the boiling temperature and the hydrochloric acid and solvent removed by free evaporation. During the distillation, the volume of distilland is kept substantially constant by intermittent or continuous addition of solvent either as liquid or vapor. As the hydrochloric acid is removed, the acid-rearrangement product solution becomes more and more concentrated and finally the rearrangement product crystallizes to form a suspension in the solvent. The distillation is continued until the distilland is substantially free of hydrochloric acid, at which time the slurry of rearrangement product in solvent is ready to be filtered. As the organic solvent used is a non-solvent for the rearrangement product, complete crystallization is obtained quickly and the crystalline slurry is very free-filtering.

The color and assay of the rearrangement product thus obtained will vary depending in part upon the time and temperature of rearrangement and distillation. By distilling in vacuum at temperatures between 45° and 50° C., light-colored products, assaying as high as 98%, can be obtained. If the temperature of distillation is maintained above 70° C., the preliminary heating period to effect rearrangement is not necessary as the rearrangement will take place concurrently with the removal of the hydrochloric acid. By properly adjusting the distillation rate, the rearrangement is completed by the time the hydrochloric acid is removed. When the temperature of distillation is sufficiently high, for example, 100–110° C., the rearrangement and removal of hydrochloric acid requires only a few minutes; and at high temperatures at atmospheric pressure or at correspondingly lower temperatures under vacuum, the process can be operated continuously. When thus operating continuously, at elevated temperature, the hydrochloric acid is removed and the rearrangement product is separated so quickly that there is very little discoloration or decomposition of product due to the action of hydrochloric acid.

While many organic solvents can be used in the process herein disclosed, non-polar solvents including hydrocarbons such as benzene, toluene, xylene, and "Solvesso #2" (a petroleum distillate rich in toluene) and chlorinated solvents such as chlorbenzene and tetrachlorethane are preferred especially during the rearrangement and the distillation of the major portion of the hydrochloric acid.

When the non-polar solvent is of high density, as in the case of tetrachlorethane, a second solvent of low density can be mixed with it so that the solvent layer will be of sufficiently low density to form a protective layer above the acid solution. For this purpose a polar solvent such as butyl or amyl alcohol can be used although any large amounts of polar solvent during the rearrangement should be avoided for the reasons before stated.

The presence of polar solvent together with non-polar solvent has advantages in the distillation stage in that the polar solvent dissolves any tarry substances that are formed, thereby giving a better colored product. Thus, when a non-polar solvent is used alone during the rearrangement and initial distillation, the color and filterability of the product are improved by adding a small proportion of polar solvent toward the end of the distillation. When added during the distillation a polar solvent also improves the crystal formation and prevents caking and adhering of crystals to the walls of the still. The latter advantages can also be attained by suitable agitation of the crystal-in-solvent suspension.

The use of a polar solvent to remove tarry substances is also effective when the polar solvent is added just prior to filtration. Moreover, when there are only traces of tarry substances present, the non-polar solvent suspension can be first filtered and the filter cake then washed with a polar solvent to remove the tars. After being washed with a polar solvent and then with ether and dried, the crystalline product is very light in color and substantially pure, assaying as high as 98%.

In the foregoing description reference has been made to treating compounds such as 2-keto-l-gulonic acid, its analogues, and derivatives thereof. It is to be understood that the process of the present invention is adapted for treating compounds of this class generally. By the term "analogues" is meant compounds such as 2- or 3-keto hexonic acids which are precursors of other ascorbic acids, 2- or 3-keto hexamethylonic acids which are precursors of desoxy ascorbic acids, and higher homologs of said 2- or 3-keto acids differing therefrom by one or more —CHOH— groups. By the term "derivatives" is meant those compounds which are readily hydrolyzed by acids to produce 2-keto-gulonic acid, and its analogues; for example, salts, esters, and methylene-ether derivatives.

When 3-keto-hexonic acids are used instead of 2-keto hexonic acids, dilute mineral acid solutions and shorter rearrangement times may be advantageously employed; however, the rearrangement is preferably conducted in the presence of a non-polar solvent and the corresponding ascorbic acid isolated by azeotropic distillation as in the manner previously described.

The following examples illustrate methods of practicing the present invention but it is to be understood that these examples are given by way of illustration and not of limitation.

Example I

About 200 gms. of diacetone 2-keto 1-gulonic acid, 100 gms. of concentrated hydrochloric acid, and 5-10 cc. of xylene are charged to a distillation apparatus and heated, with stirring, at about 70° C. for one hour. About 25 cc. of acetone, part of that liberated by decomposition of the diacetone compound, distills during this time. About 15-20 cc. of xylene is added, the system is evacuated (about 27 inch) and the mixture is distilled by heating to 50-60° C., xylene being added to maintain a constant volume of distilland in the apparatus. Practically all the hydrochloric acid is removed by 250 cc. of xylene in approximately six hours. The product, l-ascorbic acid, crystallizes as the hydrochloric acid is removed, and at the end of the distillation consists of a heavy mush together with about 25-30 cc. of xylene. About 25-30 cc. of isoamyl alcohol is added to the slurry to increase the solubility of tars and colored impurities. The batch is then cooled, filtered (very free-filtering), and washed with isoamyl alcohol and then with ether. The yield of dry, light-grey colored l-ascorbic acid is about 80% of theory.

Example II

About 240 gms. of dry 2-keto-1-gulonic acid, dissolved in about 200 gms. of concentrated hydrochloric acid and about 40 cc. of xylene are charged to a distillation apparatus and heated for about an hour at 70° C., with stirring, to effect rearrangement. The system is then evacuated to about 27 inches of vacuum and hydrochloric acid and xylene azeotropically distilled, keeping the temperature below 60° C., and xylene is added during the distillation to maintain a substantially constant volume of distilland. When practically all the hydrochloric acid has been removed the batch is worked up as in Example I giving about the same theoretical yield of l-ascorbic acid.

Example III

About 58 gms. of damp diacetone 2-keto-1-gulonic acid (assay 87.0%) is dissolved in about 20 gms. of concentrated hydrochloric acid and charged to a distillation apparatus together with about 100 cc. of toluene. The mixture is heated, with stirring, and distilled at atmospheric pressure over a period of about 40 minutes. During this distillation the temperature of the batch is increased from 70° C. to about 110° C. and about 40 cc. of toluene is added, portionwise, to the distilland. The resulting slurry, substantially free of hydrochloric acid, is filtered (very free-filtering), washed with about 50 cc. of benzene and then with 50 cc. of ether. After drying at 50° C., approximately 31.3 gms. of l-ascorbic acid is obtained, assaying 87.5%. This is a yield of about 85.4% of theory.

Example IV

Damp diacetone 2-keto-1-gulonic acid containing 50 gms. of anhydrous material is heated, with stirring, for about 25 minutes at 80° C. with 40 cc. of concentrated hydrochloric acid and 100 cc. of toluene. The hydrochloric acid is then removed in about one hour by azeotropic distillation at approximately 27-inch vacuum during which time the temperature is maintained below 55° C. The slurry of crystalline l-ascorbic acid is filtered and washed with ether giving an almost white crystalline product in a yield of about 92% of theoretical.

Example V

A solution of diacetone 2-keto-1-gulonic acid dissolved in an equal weight of concentrated hydrochloric acid is fed continuously to a distillation apparatus containing boiling toluene (temperature about 110° C.) at atmospheric pressure. Liberation of acetone and rearrangement to l-ascorbic acid occurs as hydrochloric acid is being evolved and is complete in the 2 to 3 minute interval required for azeotropic removal of hydrochloric acid. The l-ascorbic acid thus formed crystallizes as a slurry in the toluene. The hydrochloric acid solution is added at approximately one fifth the distillation rate (of the azeotropic mixture) and the volume of distilland in the apparatus is maintained approximately constant by continuous addition of toluene, preferably hot or in the vapor state, and continuous removal of crystalline slurry. The volume of distilland is adjusted so that the hold-up time is not over 30 minutes and preferably about 10 to 15 minutes. The crude l-ascorbic acid is recovered from the slurry by filtration, continuously or batchwise, and is washed substantially free of colored impurities with n-butyl alcohol. The yield is about 90% of theory.

Example VI

About 40 gms. of methyl 2-keto-1-gulonate is stirred and heated with about 25 gms. of concentrated hydrochloric acid and 10 cc. of toluene for about 40 minutes to effect rearrangement and liberation of methyl alcohol. The mixture is then subjected to azeotropic vacuum distillation at 55° C. while maintaining a substantially constant volume of distilland by addition of toluene. Hydrochloric acid is almost completely removed by 250 cc. of toluene and the resulting slurry is filtered, and washed with isopropyl alcohol and ether. The yield of almost white l-ascorbic acid is about 87% of theory.

Example VII

About 10 gms. of diacetone 2-keto-1-gulonic acid (assay 94.6%) dissolved in 8.5 cc. of concentrated hydrochloric acid (specific gravity 1.10) and about 25 cc. of benzene are charged to a distillation apparatus, and the mixture is heated to about 78° C. in five minutes. This temperature is maintained for about 30 minutes at atmospheric pressure during which time the acetone liberated by the reaction, the hydrochloric acid, and benzene are distilled. About 150 cc. of benzene is added during the distillation. The resulting slurry in benzene is filtered, washed with ether, and dried for 48 hours in a 50° oven to remove last traces of hydrochloric acid. The yield of l-ascorbic acid is about 81.4% of theory.

Example VIII

About 58 gms. of damp diacetone 2-keto-1-gulonic acid (containing 50 gms. of anhydrous material) is dissolved in about 17 cc. of concentrated hydrochloric acid, 100 cc. of chlorbenzene is added, and the mixture is stirred and distilled, at atmospheric pressure, at such a rate that practically all of the hydrochloric acid is removed in about 35 minutes. About 75 cc. of chlorbenzene is added during the rearrangement-distillation period. The resulting slurry is filtered and the cake is washed with benzol, then with ether, and dried. The yield of l-ascorbic acid is about 80% of theory.

Example IX

About 200 gms. of diacetone 2-keto-l-gulonic acid is dissolved in about 100 gms. of concentrated hydrochloric acid and about 10 cc. each of tetrachlorethane and isobutyl alcohol are added. The mixture is heated to about 70° C., with stirring, for about one hour to effect rearrangement and liberation of acetone. About 50 cc. of tetrachlorethane is then added and the mixture is distilled at about 29 inches of vacuum (temperature 45–50° C.). Tetrachlorethane is added during the distillation to replace that removed in the distillate, about 350 cc. of tetrachlorethane being required to remove substantially all of the hydrochloric acid from the mixture. The resulting heavy mush of l-ascorbic acid in about 75 cc. of tetrachlorethane is diluted with 50 cc. of isobutyl alcohol, stirred for about one hour at 50° C., cooled to room temperature and filtered. The cake is washed with isobutyl alcohol, then with ether, and dried. The yield of l-ascorbic acid, assaying 98%, is about 85% of theory.

Example X

About 50 gms. of 2-keto-l-galactonic acid is dissolved in about 25 gms. of concentrated hydrochloric acid, about 25 cc. of toluene is added, and the mixture is stirred and heated for about one hour at 70° C. to effect rearrangement. The mixture is then azeotropically distilled under vacuum (temperature about 50–55° C.), toluene being added to replace that distilled. When substantially all the hydrochloric acid is removed, the resulting slurry of l-ascorbic acid in toluene is diluted with about 25 cc. of isobutyl alcohol to dissolve tars and colored impurities. The slurry is then filtered, washed with isobutyl alcohol and ether, and dried. The yield of light-colored l-ascorbic acid is about 83% of theory.

Example XI

A solution of diacetone-2-keto-d-gluconic acid in an equal weight of concentrated hydrochloric acid is fed continuously to a distillation apparatus containing boiling toluene in the same manner as described in Example V. The rearrangement and azeotropic removal of acetone, water, and hydrochloric acid by azeotropic distillation occur simultaneously with the production of a slurry of crystalline d-araboascorbic acid in toluene. The crude ascorbic acid "analogue" is recovered from the slurry by filtration, continuously or batchwise, and is washed substantially free of color. The yield is about 85% of theory.

As used throughout the specification it is to be understood that the expressions "azeotropic distillation" and "azeotropic mixture" are not intended to imply any limitation due to exact technical definition of "azeotrope." During at least a portion of the distillation in the process herein disclosed a constant boiling mixture of hydrochloric acid and solvent, and hence a true azeotropic mixture, will be distilled. It will be apparent, however, that during a portion of the distillation, and particularly in the early part thereof, solvent mixtures may distill which are not at equilibrium and which vary in boiling point. Such mixtures are removed by what may properly be called solvent vapor distillation. It is to be understood, however, that true azeotropic distillation and this solvent vapor distillation are both embraced within the expression "azeotropic distillation" as used in the specification.

By means of this azeotropic distillation in the process of the present invention volatile components present in or evolved by chemical reaction of a starting mixture are removed, together with added organic solvent until all that remains is a suspension of a crystalline essentially non-volatile reaction product in an organic solvent vehicle is a non-solvent for said product. The suspension or slurry is very free-filtering and the crystalline product is readily recovered and purified.

It will be understood that the organic solvent employed during rearrangement and distillation is non-reactive with the starting material and rearranged product. By the expression "substantially inert organic solvent" as used in the claims is meant an organic solvent which is thus non-reactive with the starting materials and rearranged products.

While in the foregoing examples procedures have been described wherein concentrated hydrochloric acid is used to effect rearrangement, it will be understood that when other hydrohalic acids such as concentrated aqueous hydrobromic acid or concentrated aqueous hydriodic acid are employed rearrangement is effected in like manner and the hydrohalic acid is subsequently removed from the rearrangement mixture in the manner described by distillation with organic solvent.

Modifications may be made in carrying out the present invention without departing from the spirit and scope thereof, and the invention is to be limited only by the appended claims.

What is claimed is:

1. The process for preparing ascorbic acid compounds that comprises heating a 2-keto-hexonic acid compound selected from the group consisting of 2-keto-hexonic acids and esters and methylene-ether derivatives thereof, with concentrated aqueous hydrochloric acid and an organic solvent which is immiscible with aqueous hydrochloric acid and is a non-solvent for ascorbic acid compounds, thereby converting said 2-keto-hexonic acid compound to the corresponding ascorbic acid compound, and evaporating a portion of said organic solvent together with substantially all of the other volatile components, thereby forming a suspension of crystalline ascorbic acid compound in residual organic solvent.

2. The process as defined in claim 1 wherein the organic solvent employed has a specific gravity sufficiently low so that the organic solvent forms an upper layer, thereby retarding foaming and air oxidation during the reaction.

3. The process for preparing ascorbic acid compounds that comprises heating a 2-keto-hexonic acid compound selected from the group consisting of 2-keto-hexonic acids and esters and methylene-ether derivatives thereof, with concentrated aqueous hydrochloric acid and an organic solvent which is immiscible with aqueous hydrochloric acid and is a non-solvent for ascorbic acid compounds at a temperature of about 70–110° C. and at a pressure below the vapor pressure of the reaction mixture at the selected temperature, thereby effecting simultaneous conversion of said 2-keto-hexonic acid compound to the corresponding ascorbic acid compound, and evaporation of a portion of said organic solvent, together with substantially all of the other volatile components, and forming a suspension of crystalline ascorbic acid compound in residual organic solvent.

4. The process as defined in claim 3 wherein the temperature is maintained at about 100–110° C. and the process is operated continuously.

5. The process as defined in claim 1 wherein the solvent employed is toluene.

6. The process as defined in claim 1 wherein the solvent employed is xylene.

7. The process as defined in claim 1 wherein the solvent employed comprises tetrachlorethane.

8. The process as defined in claim 1 wherein the solvent employed consists of tetrachlorethane and isobutyl alcohol.

9. The process for preparing ascorbic acid compounds that comprises heating a 2-keto-hexonic acid compound selected from the group consisting of 2-keto-hexonic acids and esters and methylene-ether derivatives thereof, with concentrated aqueous hydrochloric acid and an organic solvent which is immiscible with aqueous hydrochloric acid and is a non-solvent for ascorbic acid compounds, thereby converting said 2-keto-hexonic acid compound to the corresponding ascorbic acid compound.

10. The process for recovering an ascorbic acid from a reaction mixture containing the same in aqueous hydrochloric acid, that comprises evaporating the reaction mixture together with an organic solvent which is immiscible with the aqueous hydrochloric acid and is a non-solvent for said ascorbic acid, thereby removing a portion of said solvent and substantially all of the other volatile components and forming a suspension of crystalline ascorbic acid in residual organic solvent.

11. The process for preparing l-ascorbic acid that comprises charging to a distillation apparatus 2-keto-1-gulonic acid, concentrated aqueous hydrochloric acid, and an organic solvent which is immiscible with said aqueous hydrochloric acid and is a non-solvent for l-ascorbic acid, heating the mixture thus obtained to effect rearrangement of 2-keto-1-gulonic acid to l-ascorbic acid, and to effect distillation of organic solvent, hydrochloric acid, and water evolved in said rearrangement, continuing the distillation while adding organic solvent to replace that distilled until substantially all of said hydrochloric acid and water have been removed, thereby forming a slurry of l-ascorbic acid in organic solvent, and recovering l-ascorbic acid from said slurry.

12. The process for preparing l-ascorbic acid that comprises charging to a distillation apparatus diacetone 2-keto-1-gulonic acid, concentrated aqueous hydrochloric acid, and an organic solvent which is immiscible with said aqueous hydrochloric acid and is a non-solvent for l-ascorbic acid, heating the mixture thus obtained to effect rearrangement of diacetone 2-keto-1-gulonic acid to l-ascorbic acid, and to effect distillation of organic solvent, hydrochloric acid, water and acetone evolved in said rearrangement, continuing the distillation while adding organic solvent to replace that distilled until substantially all of said hydrochloric acid, water and acetone have been removed, thereby forming a slurry of l-ascorbic acid in organic solvent, and recovering l-ascorbic acid from said slurry.

13. The process for preparing l-ascorbic acid that comprises heating 2-keto-1-gulonic acid with concentrated aqueous hydrochloric acid and an organic solvent which is immiscible with said aqueous hydrochloric acid and is a non-solvent for l-ascorbic acid, thereby converting the 2-keto-1-gulonic acid to l-ascorbic acid, and evaporating a portion of said organic solvent together with substantially all of the other volatile components, thereby forming a suspension of crystalline l-ascorbic acid in residual organic solvent.

14. The process for preparing l-ascorbic acid that comprises heating diacetone-2-keto-1-gulonic acid with concentrated aqueous hydrochloric acid and an organic solvent which is immiscible with said aqueous hydrochloric acid and is a non-solvent for l-ascorbic acid, thereby converting the diacetone 2-keto-1-gulonic acid to l-ascorbic acid, and evaporating a portion of said organic solvent together with substantially all of the other volatile components, thereby forming a suspension of crystalline l-ascorbic acid in residual organic solvent.

15. The process for preparing l-ascorbic acid that comprises charging to a distillation apparatus diacetone 2-keto-1-gulonic acid, concentrated aqueous hydrochloric acid, and toluene, heating the mixture thus obtained to effect rearrangement of diacetone 2-keto-1-gulonic acid to l-ascorbic acid and to effect distillation of a mixture composed of toluene, hydrochloric acid, and water and acetone, evolved in said rearrangement, continuing the distillation while adding toluene to replace that distilled until substantially all of said hydrochloric acid, water, and acetone have been removed, thereby forming a free-filtering slurry of l-ascorbic acid in toluene, and recovering l-ascorbic acid from said slurry.

16. The process for preparing l-ascorbic acid that comprises charging to a distillation apparatus diacetone 2-keto-1-gulonic acid, concentrated aqueous hydrochloric acid, and an organic solvent consisting of tetrachlorethane and isobutyl alcohol, heating the mixture thus obtained to effect rearrangement of the diacetone 2-keto-1-gulonic acid to l-ascorbic acid and to effect distillation of a mixture composed of organic solvent, hydrochloric acid, and water and acetone evolved in said rearrangement, continuing the distillation while adding tetrachlorethane to replace organic solvent distilled until substantially all of said hydrochloric acid, water, and acetone have been removed, thereby forming a slurry of l-ascorbic acid in tetrachlorethane, diluting the slurry with isobutyl alcohol and stirring, and recovering substantially pure l-ascorbic acid from said dilute slurry.

17. The process for preparing l-ascorbic acid that comprises charging to a distillation apparatus 2-keto-1-gulonic acid, concentrated aqueous hydrochloric acid, and xylene, heating the mixture thus obtained to affect rearrangement of 2-keto-1-gulonic acid to l-ascorbic acid and to effect distillation of a mixture composed of xylene, hydrochloric acid, and water evolved in said rearrangement, continuing the distillation while adding xylene to replace that distilled until substantially all of said hydrochloric acid and water have been removed, thereby forming a slurry of l-ascorbic acid in xylene, diluting the slurry with isoamyl alcohol, and recovering l-ascorbic acid from said dilute slurry.

18. The process for preparing l-ascorbic acid that comprises continuously adding diacetone-2-keto-1-gulonic acid, concentrated aqueous hydrochloric acid, and toluene to a reaction vessel, maintaining in the reaction vessel a temperature of approximately 110° C. and substantially atmospheric pressure, thereby effecting simultaneous and continuous conversion of said diacetone-2- keto-1-gulonic acid to 1-ascorbic acid, evaporation of a portion of the toluene together with substantially all of the other volatile components, and separation of a suspension of crystalline 1-ascorbic acid in residual toluene.

19. In a process for preparing 1-ascorbic acid, the step that comprises heating diacetone-2-keto-1-gulonic acid with concentrated aqueous hydrochloric acid and an organic solvent consisting of tetrachlorethane and isobutyl alcohol, thereby converting the diacetone-2-keto-1-gulonic acid to 1-ascorbic acid.

20. The process for recovering 1-ascorbic acid from a reaction mixture containing 1-ascorbic acid and aqueous hydrochloric acid, that comprises evaporating said reaction mixture together with tetrachlorethane thereby removing a portion of the tetrachlorethane and substantially all of the other volatile components and forming a suspension of crystalline 1-ascorbic acid in residual tetrachlorethane, diluting the suspension with isobutyl alcohol, and filtering substantially pure 1-ascorbic acid from the dilute suspension.

21. The process for recovering 1-ascorbic acid from a reaction mixture containing 1-ascorbic acid and aqueous hydrochloric acid, that comprises evaporating said reaction mixture together with xylene, thereby removing a portion of the xylene and substantially all of the other volatile components and forming a suspension of crystalline 1-ascorbic acid in residual xylene.

HENRY H. BASSFORD, Jr.
WILLIAM S. HARMON.
JOHN F. MAHONEY.

REFERENCES CITED

The following references are of record in the file of this patent:

UNITED STATES PATENTS

| Number | Name | Date |
|---|---|---|
| 2,129,317 | Elger | Sept. 6, 1938 |
| 2,185,383 | Pasternack | Jan. 2, 1940 |
| 2,189,778 | Dalmer and Heyns | Feb. 13, 1940 |
| 2,322,800 | Frey | June 29, 1943 |